F. E. & J. S. BRADLEY.
CULTIVATOR TOOTH.
APPLICATION FILED AUG. 2, 1909.
949,696.
Patented Feb. 15, 1910.
2 SHEETS—SHEET 1.
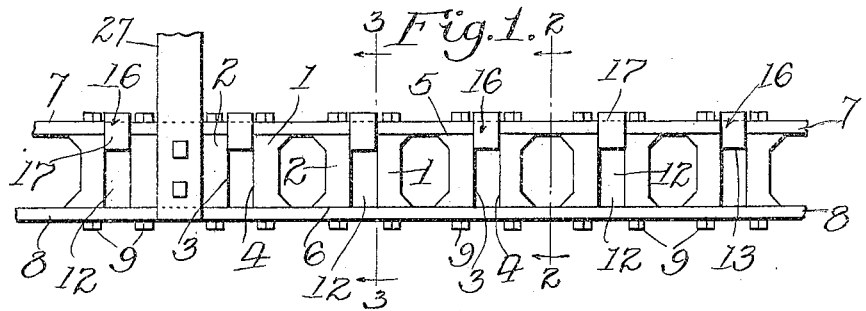
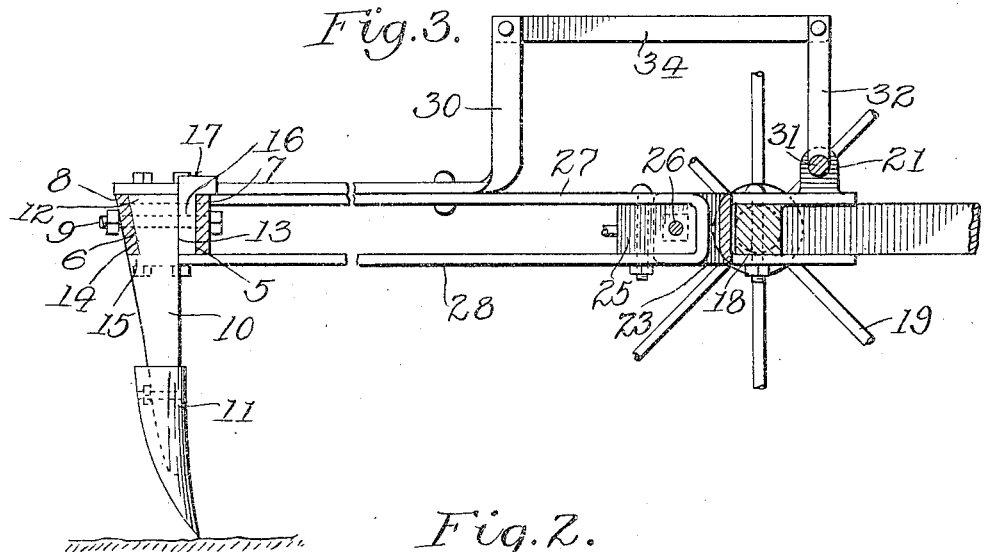
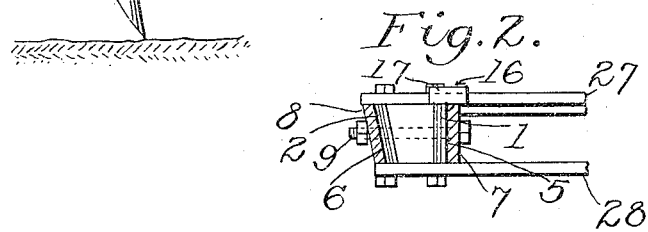
Witnesses:—
Inventors,
Frank E. Bradley.
John S. Bradley.
Attorney.

F. E. & J. S. BRADLEY.
CULTIVATOR TOOTH.
APPLICATION FILED AUG. 2, 1909.

949,696.

Patented Feb. 15, 1910.

2 SHEETS—SHEET 2.

Witnesses:
C. J. Williams
Helen M. Driscoll

Inventors,
Frank E. Bradley,
John S. Bradley.
by Semer G. Wells
Attorney.

UNITED STATES PATENT OFFICE.

FRANK E. BRADLEY AND JOHN S. BRADLEY, OF CORONA, CALIFORNIA.

CULTIVATOR-TOOTH.

949,696. Specification of Letters Patent. Patented Feb. 15, 1910.

Original application filed June 30, 1909, Serial No. 505,253. Divided and this application filed August 2, 1909. Serial No. 510,826.

*To all whom it may concern:*

Be it known that we, FRANK E. BRADLEY and JOHN S. BRADLEY, citizens of the United States, residing at Corona, California, have invented a new and useful Cultivator-Tooth, of which the following is a specification.

Our object is to construct a cultivator tooth and housing so that the tooth may be readily removed or replaced; and our invention consists of the novel features herein shown, described and claimed.

Figure 5:
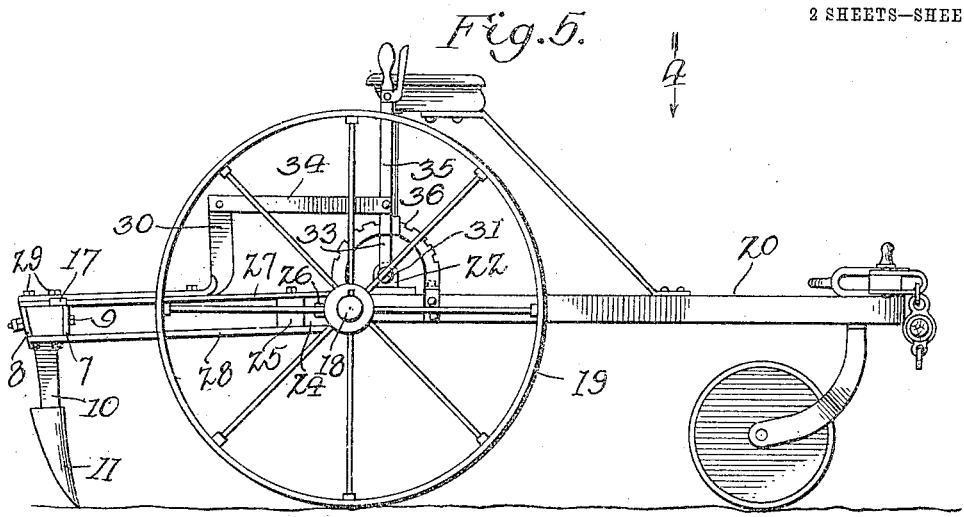
Figure 4:
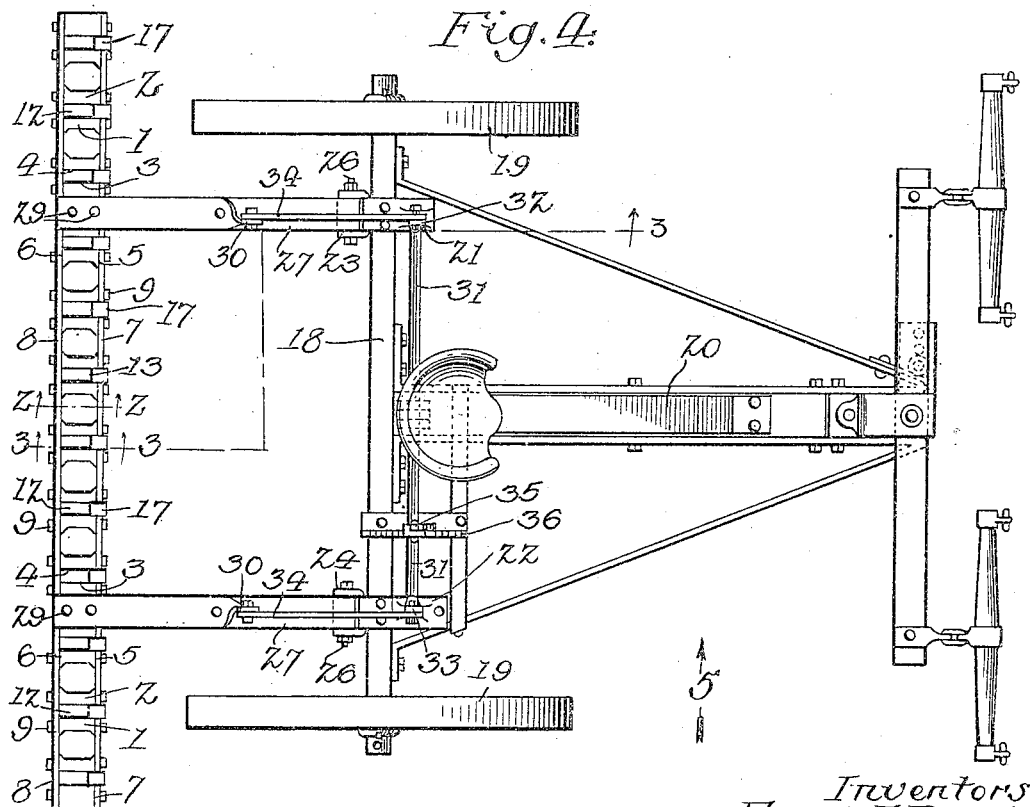

In the drawings: Figure 1 is a top plan view of a fragment of a cultivator bar showing cultivator teeth embodying the principles of our invention. Fig. 2 is a cross-section on the line 2—2 of Fig. 1 and showing the construction of the cultivator bar. Fig. 3 is a cross-section on the line 3—3 of Fig. 1 and showing a cultivator tooth in elevation. Fig. 4 is a plan view of a cultivator employing our improved cultivator-tooth construction. Fig. 5 is a side elevation of the cultivator and taken looking in the direction indicated by the arrow 5 in Fig. 4.

Referring to the drawing in detail, the cultivator bar comprises: a pair of spacing-blocks 1 and 2 for each tooth, said spacing-blocks 1 and 2 having straight inner faces 3 and 4, straight front faces 5 and beveled rear faces 6; the dimension bar 7 fitting against the straight front faces 5; the dimension bar 8 fitting against the beveled rear faces 6; and the stay bolts 9 inserted through the dimension bars and through the spacing blocks to form wedge-shaped housings for the cultivator teeth.

Each cultivator tooth comprises: a shank 10; a shovel 11 upon the lower end of the shank; the wedge-shape head 12 extending upwardly from the shank 10 and having a straight front face 12 and having a beveled rear face 14; the shoulder 15 extending backwardly from the upper end of the shank below the head 12; the key shank 16 fitting between the head 12 and the dimension bar 7 so as to press the beveled face 14 against the dimension bar 8 and hold the parts securely together; and the key-head 17 upon the key-shank so that the key-shank may be removed to loosen the tooth by driving upwardly on the key-head.

Especial attention is called to the facility with which the cultivator teeth may be removed for the purpose of repair or change, that is simply by driving the keys out.

In Figs. 4 and 5 we have shown a cultivator employing our cultivator-tooth construction. The axle 18 is mounted upon two wheels 19, the tongue 20 extends forwardly from the axle, and bearing-blocks 21 and 22 are fixed upon the axle near its ends. The rear ends of the bearing-blocks 21 and 22 are bifurcated to form the hinge-members 23 and 24 and the hinge-members 25 are placed between the bifurcations and secured by the bolts, or hinge-pins 26, and draft-bars connect the hinge-members 25 to the dimension-bars 7 and 8, each draft-bar comprising an upper strap 27 and a lower strap 28, fitting respectively above and below the dimension-bars and secured in place by bolts 29. Arms 30 extend upwardly from the draft-bars. A tilting-lever shaft 31 is mounted in the bearing-blocks 21 and 22 and arms 32 and 33 extend upwardly from the tilting-shaft, the upper ends of said arms being connected to the upper ends of the arms 30 by links 34. A tilting-lever 35 extends upwardly from the tilting-shaft 31, there being a pawl-and-rack-connection 36 between the tilting-lever and the frame, so that by manipulating the tilting-lever the cultivator teeth may be raised or lowered.

This application is a division of a companion application, patented October 26, 1909, we have shown, described and claimed the details of the cultivator and we do not desire to make such claims in this application.

We are aware that cultivator-teeth have been placed in sockets and held by keys and we do not desire to claim such construction broadly, but we are not aware that a wedge-shaped housing and a cultivator tooth have been made, the front side of the housing being straight and the rear side of the housing being inclined, the front side of the cultivator-tooth being straight and the rear side of the cultivator-tooth being inclined and there being a shoulder upon the rear side of the cultivator-tooth to engage under the wedge-shaped housing, and there being a straight key in the housing in front of the cultivator-tooth.

We claim:

1. A cultivator-tooth construction comprising a series of spacing-blocks; the front faces of the spacing-blocks being straight, and the rear faces of the spacing-blocks being beveled; a front dimension-bar against the straight front faces of the spacing-blocks; a rear dimension-bar against the beveled rear faces of the spacing-blocks; bolts inserted through the dimension-bars and through the spacing-blocks so as to connect the spacing-blocks together in pairs, each pair forming wedge-shaped housings; cultivator-tooth-heads fitting in the housings and having beveled rear faces to fit the rear dimension-bar, and having shoulders to engage under the rear dimension-bar, straight key-shanks inserted in the housings in front of the cultivator-tooth-heads, and cultivator-shanks extending downwardly from the cultivator-tooth-heads.

2. A cultivator-tooth construction comprising a series of spacing-blocks; the front faces of the spacing-blocks being straight, and the rear faces of the spacing-blocks being beveled, a front dimension-bar against the straight front faces of the spacing-blocks, a rear dimension-bar against the beveled rear faces of the spacing-blocks, bolts inserted through the dimension-bars and through the spacing-blocks so as to connect the spacing-blocks together in pairs, each pair forming wedge-shaped housings, cultivator-tooth-heads fitting in the housings and having beveled rear faces to fit the rear dimension-bar, and having shoulders to engage under the rear dimension-bar, straight key-shanks inserted in the housings in front of the cultivator-tooth-heads, cultivator-shanks extending downwardly from the cultivator-tooth-heads, and key-heads upon the key-shanks for removing the key-shanks.

3. A cultivator-tooth construction comprising means forming a wedge-shaped housing; the front side of the housing being straight and the rear side of the housing being inclined; a cultivator-tooth head having a straight front face and an inclined rear face; a shoulder on the rear side of the cultivator-tooth head and engaging under the wedge-shaped housing; and a straight key fitting in the wedge-shaped housing between the straight front side of the housing and the straight front face of the head.

FRANK E. BRADLEY.
JOHN S. BRADLEY.

Witnesses:
P. STONEBRAKER,
JOE WRIGHT.